US012007232B2

United States Patent
Hurwitz

(10) Patent No.: US 12,007,232 B2
(45) Date of Patent: Jun. 11, 2024

(54) METHODS TO CONTINUOUSLY MONITOR BATTERY CELL PHYSICAL HEALTH AND SWELL

(71) Applicant: Google LLC, Mountain View, CA (US)

(72) Inventor: Jonathan D. Hurwitz, Mountain View, CA (US)

(73) Assignee: Google LLC, Mountain View, CA (US)

(*) Notice: Subject to any disclaimer, the term of this patent is extended or adjusted under 35 U.S.C. 154(b) by 270 days.

(21) Appl. No.: 17/435,930

(22) PCT Filed: May 30, 2019

(86) PCT No.: PCT/US2019/034576
§ 371 (c)(1),
(2) Date: Sep. 2, 2021

(87) PCT Pub. No.: WO2020/242476
PCT Pub. Date: Dec. 3, 2020

(65) Prior Publication Data
US 2022/0146248 A1    May 12, 2022

(51) Int. Cl.
*G01B 7/28* (2006.01)
*G01L 1/14* (2006.01)
(Continued)

(52) U.S. Cl.
CPC ............... *G01B 7/28* (2013.01); *G01L 1/142* (2013.01); *G01L 1/20* (2013.01); *G01L 5/10* (2013.01);
(Continued)

(58) Field of Classification Search
CPC .. G01B 7/28; G01L 1/142; G01L 1/20; G01L 5/10; H01M 10/425; H01M 10/445;
(Continued)

(56) References Cited

U.S. PATENT DOCUMENTS 9,263,900 B2    2/2016  Ju et al.
2005/0191542 A1*  9/2005  Bushong ............. H01M 50/154
                                                    429/50
(Continued)

FOREIGN PATENT DOCUMENTS

EP    1336210    7/2006
EP    1856760    3/2010
(Continued)

OTHER PUBLICATIONS

International Searching Authority, International Search Report and Written Opinion dated Feb. 19, 2020, issued in connection with International Patent Application No. PCT/US2019/034576, filed on May 30, 2019, 13 pages.

*Primary Examiner* — Peter J Macchiarolo
*Assistant Examiner* — John M Royston
(74) *Attorney, Agent, or Firm* — McDonnell Boehnen Hulbert & Berghoff LLP

(57) ABSTRACT

The present disclosure relates to methods for monitoring the health of a battery cell. Specifically, the method includes receiving, by a controller communicatively coupled a pressure sensor positioned proximate to a battery housing having an initial volume and an initial shape and containing a battery cell, a pressure value indicative of a current volume or a current shape of the battery' housing. The pressure sensor is configured to measure the pressure value indicative of the current volume or the current shape of the battery' housing. The method also involves comparing, by the controller, the pressure value to a predetermined threshold pressure value. The method further involves adjusting, by the controller and based on the comparison, at least one parameter associated with operations of the battery cell.

14 Claims, 10 Drawing Sheets

Oblique Non-Expanded View

(51) Int. Cl.
  *G01L 1/20* (2006.01)
  *G01L 5/10* (2020.01)
  *H01M 10/42* (2006.01)
  *H01M 10/44* (2006.01)
  *H01M 10/48* (2006.01)

(52) U.S. Cl.
  CPC ....... *H01M 10/425* (2013.01); *H01M 10/445* (2013.01); *H01M 10/48* (2013.01); *H01M 2010/4271* (2013.01); *H01M 2220/30* (2013.01)

(58) Field of Classification Search
  CPC ....... H01M 10/48; H01M 2010/04271; H01M 2220/30; Y02E 60/10
  See application file for complete search history.

(56) References Cited

U.S. PATENT DOCUMENTS

2016/0064780 A1  3/2016  Jarvis et al.
2017/0108326 A1* 4/2017  Hopkins ............... H01M 10/48

FOREIGN PATENT DOCUMENTS

| KR | 101293206 | 8/2013 |
| WO | 2017/087807 | 5/2017 |

\* cited by examiner

Oblique Non-Expanded View

Oblique Expanded View

Oblique Non-Expanded View

METHODS TO CONTINUOUSLY MONITOR BATTERY CELL PHYSICAL HEALTH AND SWELL

CROSS-REFERENCE TO RELATED APPLICATIONS

This application is a national stage application under 35 U.S.C. § 371 of International Application No. PCT/US2019/34576, filed May 30, 2019, which is incorporated by reference herein in its entirety.

BACKGROUND

Battery cells can physically expand in shape and/or volume. Often, this expansion can occur during normal operation of the battery cell. For example, if the battery cell is repeatedly charged to a relatively high cell voltage compared to a maximum cell voltage of the battery cell (e.g., a battery cell with a maximum cell voltage of 4.5 volts is charged near or at 4.5 volts or higher), if the battery cell is frequently charged with a high charge current, or if the battery cell is overheated due to exposure to a hot environment. In such scenarios, the battery cell may release gases due to chemical decomposition, which may cause the battery cell to expand or "swell".

SUMMARY

Embodiments in the present disclosure relate to methods to continuously monitor the physical health and at least one physical dimension of a battery cell. Namely, the various embodiments herein describe systems and methods to detect battery cell expansion and responsively adjust operating parameters to preemptively mitigate the effect of battery cell swelling.

In one aspect, a system is provided. The system includes a battery cell. The battery cell includes a battery housing that has an initial volume and an initial shape. The system also includes a pressure sensor that is positioned proximate to the battery housing. The pressure sensor is configured to measure a pressure value indicative of a current volume or a current shape of the battery housing. The system also includes a controller. The controller is operable to perform operations, including receiving, from the pressure sensor, a pressure value indicative of the current volume of a current shape of the battery housing; comparing the pressure value to a predetermined threshold pressure value; and based on the comparison, adjusting at least one operating parameter of the system.

In another aspect, a device is provided. The device includes a pressure sensor. The pressure sensor is positioned proximate to a battery housing having an initial volume and an initial shape and containing a battery cell. The pressure sensor is configured to measure a pressure value indicative of a current volume or a current shape of the battery housing. The device also includes a controller that is operable to perform operations. The operations include: receiving, from the pressure sensor, a pressure value indicative of the current volume of the current shape of the battery housing; comparing the pressure value to a predetermined threshold pressure value; and, based on the comparison, adjusting at least one operating parameter of the device.

In yet another aspect, a method is provided. The method includes receiving, by a controller communicatively coupled to a pressure sensor positioned proximate to a battery housing having an initial volume and an initial shape and containing a battery cell, a pressure value indicative of a current volume or a current shape of the battery housing. The pressure sensor is configured to measure the pressure value indicative of the current volume or the current shape of the battery housing. The method also involves comparing, by the controller, the pressure value to a predetermined threshold pressure value. The method further involves adjusting, by the controller and based on the comparison, at least one parameter associated with operations of the battery cell.

Other aspects, embodiments, and implementations will become apparent to those of ordinary skill in the art by reading the following detailed description, with reference where appropriate to the accompanying drawings.

DETAILED DESCRIPTION

Figure 1A:
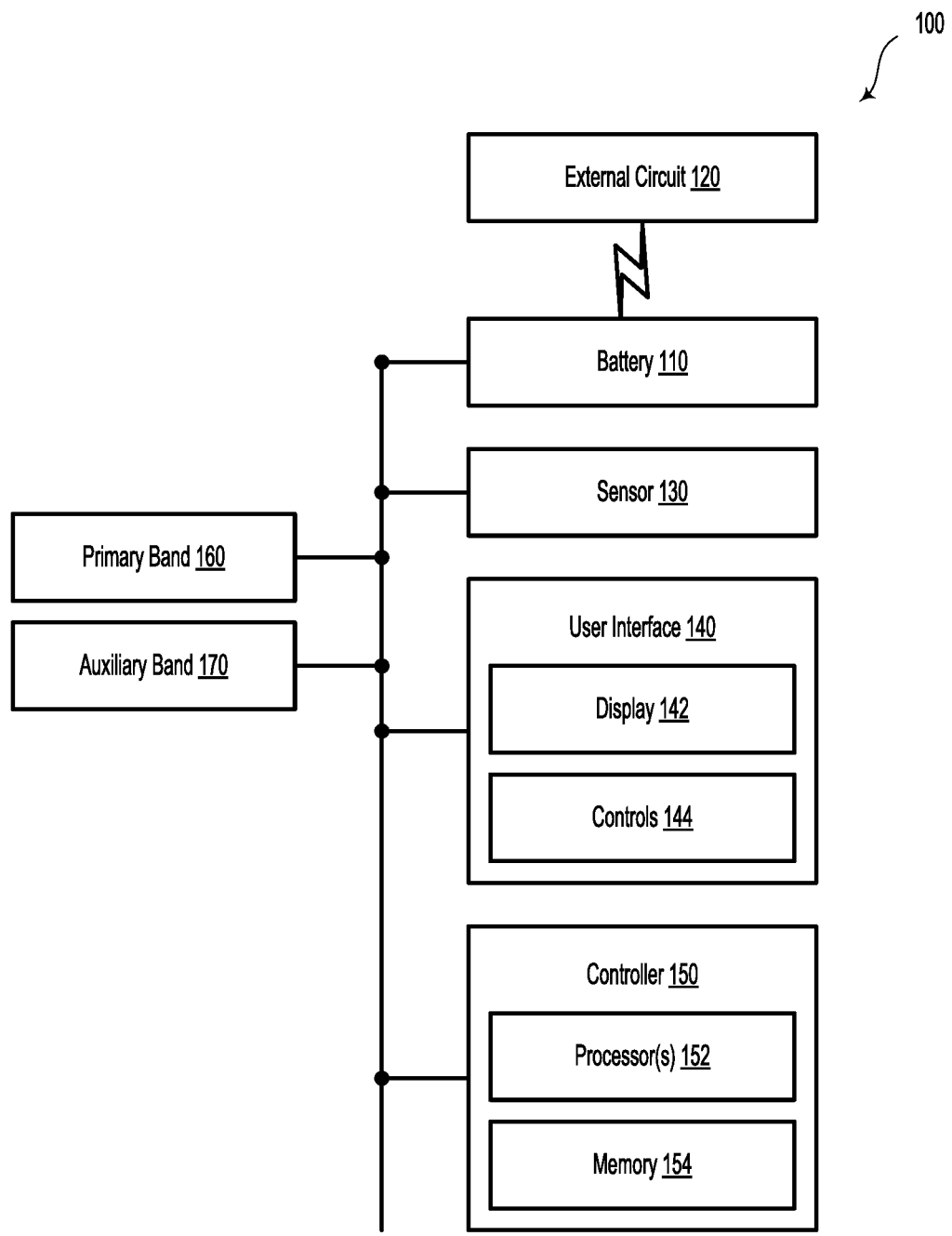
FIG. 1A illustrates a schematic diagram of a system, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

Upon charging, discharging, and other operations, a battery cell may undergo chemical reactions that release gases.

In some cases, the volume of the battery cell housing may be sealed and its volume could be too small to contain the accumulation of gas. As a result, the accumulating gas may eventually cause the battery cell housing to increase in shape and/or volume, otherwise known as "swelling".

In some cases, swelling may be harmful. For example, swelling may cause the battery cell housing to break or rupture, releasing gas into the environment. Moreover, if the battery cell powers a device (e.g., a cell phone), swelling may cause the battery cell housing to encroach on and potentially damage other components of the device, such displays, electrical wiring, controllers, processors, and/or memory.

To address this and other issues, the embodiments herein provide systems and methods configured to continuously monitor the physical health and at least one physical dimension of a battery and responsively adjust operating parameters to minimize or reduce the effects of battery cell swelling.

In an example embodiment, a system could include several elements including: a battery cell, a battery housing that contains the battery cell, a pressure sensor, a controller, and a communication interface between the pressure sensor and a controller.

In an example embodiment, the system could be utilized as part of a mobile computing device. For example, the system could form part or all of a battery subsystem of the mobile device and may act as a power source for various elements disposed within the mobile device. In some embodiments, the system may be used in other computing devices, such as printing devices, camera devices, laptop devices, and/or wearable devices. In some embodiments, the system could be utilized as a standalone external battery sensor package.

In an example embodiment, the pressure sensor may be positioned proximate to the battery housing. For example, the pressure sensor may be fixed directly on the battery housing or may be placed within a few (e.g., 1 or 2) millimeters away from the battery housing. In examples, the pressure sensor may be configured to detect the extent of physical expansion of the battery housing by measuring the physical force applied by battery housing on the pressure sensor.

In an example embodiment, the system may include a primary band coupled around a perimeter of the battery housing. The primary band may have a sensor housing unit that contains the pressure sensor. The primary band may be able to increase tension in proportion to expansions of the battery housing. As such, the pressure value determined by the pressure sensor may be based, at least in part, by a current tension of the primary band with respect to the battery housing.

In an example embodiment, the system may include an auxiliary band also coupled around the perimeter of the battery housing. The auxiliary band may be positioned substantially perpendicular to the primary band so as to couple to a substantially different part of the surface of the battery housing than the primary band, thereby increasing the overall surface area of the battery housing bounded by the primary and auxiliary bands. Similar to the primary band, the auxiliary band may be able to increase tension in proportion to expansions of the battery housing. As such, the pressure value determined by the pressure sensor may be based, at least in part, by a current tension of the auxiliary band with respect to the battery housing.

In an example embodiment, upon receiving the magnitude of pressure applied by the battery housing, the controller may compare the magnitude to a threshold pressure value. If the magnitude meets or exceeds the threshold pressure value, the controller may adjust operating parameters of the system to reduce further expansion of the battery housing.

In an example embodiment, adjusting the operating parameters of the system may include lowering the maximum possible charge capacity of the battery cell. For example, if the battery cell has a 350 mAh capacity, the system may lower the charge capacity to 340 mAh.

In an example embodiment, adjusting the operating parameters of the system may include adjusting the charging rate of the battery cell. This may be done in order to keep the temperature of the system low if battery cell expansion is detected.

Notably, the system may contain other aspects and features that may be understood from the disclosure herein.

II. EXAMPLE SYSTEMS

FIG. 1 illustrates a schematic diagram of system 100, according to example embodiments. System 100 includes battery 110, sensor 130, optional user interface 140, controller 150, primary band 160, and auxiliary band 170.

Battery 110 may include a rechargeable battery. Among other possibilities, battery 110 may include one or more of a nickel-cadmium (NiCd) cell, a nickel-zinc (NiZn) cell, a nickel metal hydride (NiMH) cell, a lithium polymer (Li—Po) cell, or a lithium-ion (Li-ion) cell. Battery 110 may be operable to provide electrical power for elements of system 100.

In an example embodiment, battery 110 may be configured to operate with a predetermined cell voltage. For example, the predetermined cell voltage could be 4.5 volts, or another voltage between 2 volts-200 volts. In an example embodiment, battery 110 may be configured to operate with a cell voltage of at least 3.5 volts. Other operating cell voltages are also possible.

In some embodiments, battery 110 may be operable to retain an 80% capacity over at least 400 charge/discharge cycles. That is, battery 110 may have an initial charge capacity upon initial normal use and may provide at least 400 charge/discharge cycles before its "fully charged" charge capacity falls below 80% of the initial charge capacity. In other embodiments, battery 110 may be operable to retain 70% capacity over at least 500 charge/discharge cycles. In an example embodiment, the charge capacity of battery 110 could be 300-400 mAh. Other charge capacities are also possible.

In an example embodiment, battery 110 may be electrically coupled to external circuit 120. For example, battery 110 may generally provide power to external circuit 120. In some cases, such as while charging battery 110, external circuit 120 may provide power to battery 110 so as to recharge it.

External circuit 120 may include an electronic device, such as a computer, a laptop, a smartphone, a wearable device, a smartwatch, a tablet, an electric car, an electrical grid, or a mobile computing device. In some cases, external circuit 120 may include one or more devices that consume electrical power provided by battery 110. Additionally, as described above, external circuit 120 may include a charging device configured to recharge battery 110 (e.g., a battery charger device).

Sensor 130 may be configured to determine a state of, and/or a position of, elements within system 100. As such, the sensor may include a proximity sensor, a pressure sensor (including a capacitance pressure sensor and a resistive pressure sensor), or a Hall Effect sensor. Other types of sensors are contemplated. In an example embodiment, sensor 130 may provide information that may be used to determine the shape and/or volume of elements within system 100.

User interface 140 may include an optional display 142 and controls 144. Display 142 may be configured to provide images and/or graphical elements to a user of system 100. In an example embodiment, display 142 may include a liquid crystal display (LCD) display, a light emitting diode (LED) based display, a display using digital light processing (DLP®) technology, and/or one or more other similar displays, now known or later developed. Controls 144 may include any combination of keypad, keyboard, touch-sensitive or presence-sensitive panel, joystick, microphone, switches, buttons, touch-sensitive surfaces, and/or other user input devices. A user may monitor and/or adjust the operation of system 100 via controls 144. In an example embodiment, controls 144 may be used to trigger one or more of the operations described herein.

System 100 may optionally include a communication interface (not illustrated) that may allow system 100 to communicate, using analog or digital modulation, with other devices, access networks, and/or transport networks. In some embodiments, the communication interface may facilitate circuit-switched and/or packet-switched communication, such as plain old telephone service (POTS) communication and/or Internet protocol (IP) or other packetized communication. For instance, the communication interface may include a chipset and antenna arranged for wireless communication with a radio access network or an access point. Also, the communication interface may take the form of or include a wireline interface, such as an Ethernet, Universal Serial Bus (USB), or High-Definition Multimedia Interface (HDMI) port. The communication interface may also take the form of or include a wireless interface, such as a Wifi, BLUETOOTH®, BLUETOOTH LOW ENERGY®, global positioning system (GPS), or wide-area wireless interface (e.g., WiMAX or 3GPP Long-Term Evolution (LTE)). However, other forms of physical layer interfaces and other types of standard or proprietary communication protocols may be used over the communication interface. Furthermore, the communication interface may include multiple physical communication interfaces (e.g., a Wifi interface, a BLUETOOTH® interface, and a wide-area wireless interface).

System 100 can also optionally include an analog to digital converter (ADC) operable to convert analog signals from sensor 130 into digital signals. In some cases, the ADC may be contained within controller 150.

Controller 150 may include one or more processor(s) 152 and memory 154, such as a non-transitory computer readable medium. Processor(s) 152 may include one or more general purpose processors—e.g., microprocessors—and/or one or more special purpose processors—e.g., image signal processors (ISPs), digital signal processors (DSPs), graphics processing units (GPUs), floating point units (FPUs), microcontrollers (MCUs), network processors, or application-specific integrated circuits (ASICs). Memory 154 may include one or more volatile and/or non-volatile storage components, such as magnetic, optical, flash, or organic storage, and may be integrated in whole or in part with processor(s) 152. Memory 154 may include removable and/or non-removable components.

Processor(s) 152 may be capable of executing program instructions (e.g., compiled or non-compiled program logic and/or machine code) stored in memory 154 to carry out the various functions described herein. Therefore, memory 154 may include a non-transitory computer-readable medium, having stored thereon program instructions that, upon execution by processor(s) 152, cause system 100 to carry out any of the methods, processes, or operations disclosed in this specification and/or the accompanying drawings. The execution of program instructions by processor(s) 152 may result in processor(s) 152 using data provided by various other elements of the system 100. In an example embodiment, the controller 150 may include a distributed computing network and/or a cloud computing network.

Primary band 160 and auxiliary band 170 may be formed from a semi-elastic or elastic material, such as rubber, nylon, vinyl. In some cases, the material may include a thermally conductive material that can reduce the temperature of battery 110 (e.g., by way of heat-sinking). For example, material could include rubber, rubbers with deposits of thermally conductive materials (e.g., aluminum or copper deposits within a rubber material), plastics, graphite, silicon, and so on.

Figure 1B:
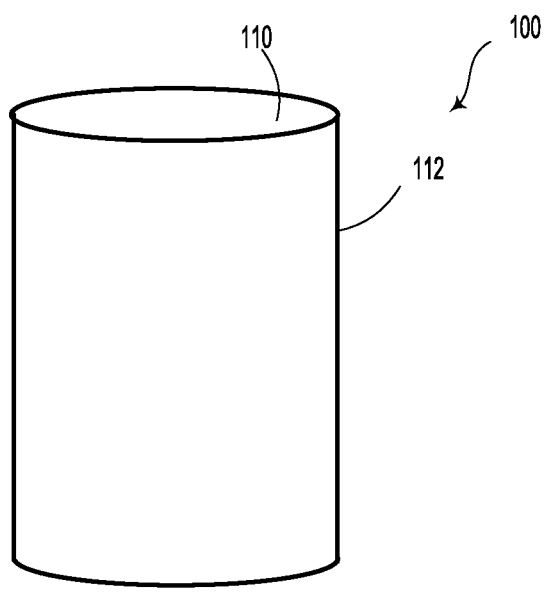
FIG. 1B illustrates a battery housing, according to example embodiments.
Figure 1C:
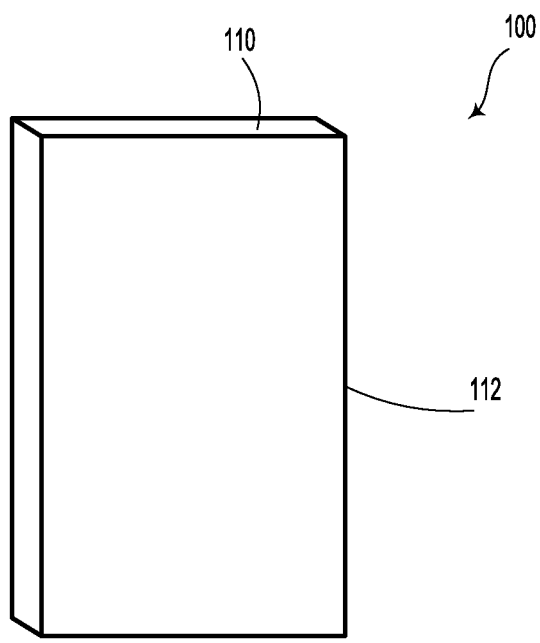
FIG. 1C illustrates a battery housing, according to example embodiments.

As illustrated in FIGS. 1B and 1C, battery 110 may be inserted or otherwise packaged within battery housing 112. In particular, FIG. 1B illustrates a cylindrically shaped battery cell housing, whereas FIG. 1C illustrates a flat shaped battery cell housing. However, these arrangements are not limiting and other shapes and/or arrangements of battery cell housing 112 are also possible.

In FIGS. 1B and 1C, battery housing 112 may include an enclosure formed from at least one of: plastic, glass, ceramic, or metal. In some embodiments, battery housing 112 may include a standard form factor (e.g., a standard battery cell shape and/or size). For example, battery housing 112 may be cylindrically-shaped according to the 18650 cell standard (e.g., 18.6 mm diameter×65.2 mm length). Other common cell form factors are possible. For example, battery housing 112 may be formed according to 32650 (32 mm diameter×67.7 mm length), 21-70 (21 mm diameter-71 mm length), AAA, AA, CR2, 9V, C. D, or another cell size format. In some embodiments, battery housing 112 may include a prismatic battery cell format.

In an example embodiment, battery housing 112 may include a pouch formed from aluminized polymer or a polymer laminate material. Additionally and/or alternatively, battery housing 112 may include electrical feed-throughs to provide electrical connections to battery 110. In some embodiments, battery housing 112 may include extra volume and/or material so as to accommodate gases that may be outgassed from battery 110 during a cell formation process or during normal battery operation. In some embodiments, the material of battery housing 112 may be flexible so as to expand to accommodate gas outgassed from battery 110. In an example embodiment, battery housing 112 may be pressure- and/or heat-sealed on one or more surfaces so as to enclose, package, and protect battery 110. In some cases, battery housing 112 may contain a controllable vent hole to allow release of gas.

In some embodiments, the elasticity of the material that forms battery housing 112 may be greater than that of primary band 160 and auxiliary band 170. In other words, the material of primary band 160 and auxiliary band 170 may be more rigid than the material of battery housing 112.

During discharge/recharge cycles, battery 110 may produce gas that causes battery housing 112 to expand in volume or shape. In some cases, the gas may be produced as a result of overcharging battery 110, overheating of battery 110, normal operation of battery 110 and/or other factors that may degrade battery 110. Accordingly, the embodiments herein may be operable to prevent and or mitigate the effects of swelling of battery housing 112.

Further, it should be understood that FIGS. 1A, 1B, and 1C are used for the purpose of example. Other arrangements and configurations of system 100 are possible.

III. EXAMPLE DEVICES

FIGS. 2A-2D illustrate several non-limiting examples of device 200 as contemplated in the present disclosure. In some embodiments, device 200 could be similar or identical to system 100 or components within system 100 as described in FIG. 1.

It should be noted that while device 200 may be contained within a computing device, for example, smartphone device, mobile device, tablet device, and so on, the use of the term "device" herein is not intended to limit the embodiments of device 200 within the confines of a computing device. Indeed, in some cases, device 200 can be a standalone apparatus uncoupled from any computing device.

Figure 2A:
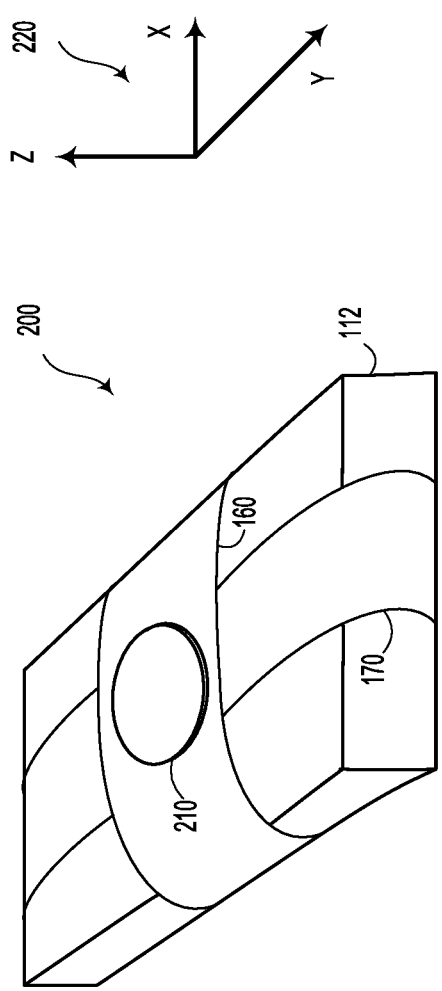
FIG. 2A illustrates a device in a non-expanded state, according to example embodiments.

FIG. 2A illustrates device 200 in a non-expanded state, according to example embodiments. Device 200 may include primary band 160, auxiliary band 170, and sensor housing 210. However, other components are also possible.

Notably, FIG. 2A also includes legend 220. It will be appreciated that the legend 220 is used solely a convenient conceptual representation of directions, and is not intended to be limiting with respect to example embodiments or techniques described herein.

Primary band 160 and auxiliary band 170 may be arranged around the surface of battery housing 112. More specifically, primary band 160 and auxiliary band 170 may be arranged in physical contact with battery housing 112 so as to wrap at least a portion (e.g., 30% or 40%) of the surface area of battery housing 112.

In some examples, the arrangement of primary band 160 and auxiliary band 170 can be "snug". That is, primary band 160 and auxiliary band 170 may be arranged tightly around the surface of battery housing 12 such that primary band 160 and auxiliary band 170 are physically touching the surface of battery housing 112. In other examples, the arrangement can be "loose". That is, primary band 160 and auxiliary band 170 may be arranged around the surface of battery housing 112 such that a small amount of space (e.g., 1 mm) exists at some sections between primary band 160 and auxiliary band 170 and the surface of battery housing 112.

In some examples, the position of primary band 160 may intersect one or more portions of auxiliary band 170. More specifically, primary band 160 and auxiliary band 170 may each encircle at least one common surface area region of battery housing 112. In some cases, the intersection may be such that primary band 160 rests on top of auxiliary band 170 with respect to battery housing 112. However, other intersections and geometric arrangements of the primary band 160, the auxiliary band 170, and battery housing 112 are possible.

In some examples, the position of primary band 160 may be substantially perpendicular to that of auxiliary band 170. Such positioning may allow the combination of primary band 160 and auxiliary band 170 to cover a large surface area of battery housing 112. As used herein, the term "substantially" can mean being largely, but not wholly of what is specified. For example, "a position substantially perpendicular" can mean a position that is completely perpendicular (i.e., at a 90-degree angle) or a position that is more perpendicular than not (e.g., at an 80-100 degree angle or a 50-130 degree angle).

The cross sectional areas of primary band 160 and auxiliary band 170 may be dissimilar or may be equivalent to each other. In one example, the cross sectional areas of primary band 160 and auxiliary band 170 may be designed such that primary band 160 and auxiliary band 170 encompass 50% of the surface area of battery housing 112. In another example, the cross sectional areas of primary band 160 and auxiliary band 170 may be designed such that primary band 160 and auxiliary band 170 encompass 90% of the surface area of battery housing 112.

The respective thicknesses of primary band 160 and auxiliary band 170 may be dissimilar or may be equivalent to each another. In some examples, the thickness of primary band 160 and auxiliary band 170 may be based on the material and/or size of battery housing 112.

Sensor housing 210 may be a cavity, socket, or region located within primary band 160 or auxiliary band 170. In some embodiments, sensor housing 210 could be arranged between the primary band 160 and the battery housing 112. Additionally or alternatively, sensor housing 210 could be arranged between the auxiliary band 170 and the battery housing 112. Sensor housing 210 may contain sensor 130 (not shown) and may be arranged such that sensor 130 is positioned proximate to battery housing 112. For example, sensor housing 210 may be arranged such that sensor 130 is fixed directly on battery housing 112 or placed within a few millimeters (e.g., between 1-2 millimeters) from battery housing 112.

In examples, sensor housing 210 may be responsive to the tension of primary band 160 and/or auxiliary band 170. In some embodiments, sensor housing 210 may experience tensile and/or compressive forces in proportion to a current tension of the primary band 160 with respect to battery housing 112 and/or a current tension of the auxiliary band 170 with respect to battery housing 112.

Figure 2B:
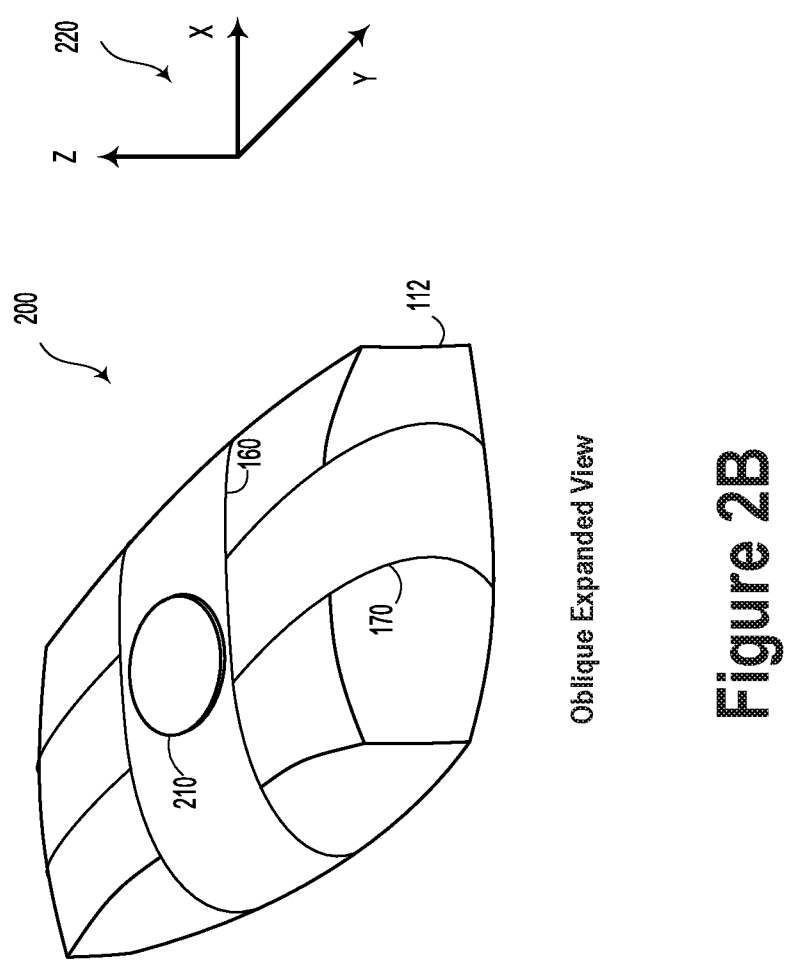
FIG. 2B illustrates a device in an expanded state, according to example embodiments.

FIG. 2B illustrates device 200 in an expanded (e.g., swollen) state, according to example embodiments. As shown in FIG. 2B, the battery housing 112 has expanded in shape and volume from battery housing 112 depicted in FIG. 2A. As noted above, such expansion may occur from accumulated gas within battery housing 112.

Expansions in the shape and volume of battery housing 112 may occur in and/or along each of the x, y, and z axis, as demarcated by legend 220. For example, the shape of battery housing 112 may increase 1 mm in the +x axis, 2 mm in the −y axis, and 3 mm in the +z axis. Other directional increases are also contemplated. Since primary band 160 and auxiliary band 170 are wrapped around the surface of battery housing 112, primary band 160 and auxiliary band 170 may experience tensile and/or compressive forces proportional to the expansion of battery housing 112. These tensile and/or compressive forces may be exerted as pressure on sensor 130, via sensor housing 210. As such, the pressure value of sensor 130 may be indicative of the current tension of the primary band 160 and auxiliary band 170 with respect to battery housing 112, which in turn is based on the of the current volume or the current shape of battery housing 112.

In some embodiments, battery housing 112 may be designed such that expansions in shape or volume primarily occur along a principal axis. In the disclosure herein, the z-axis of legend 220 may be used to represent this principal axis. In examples, the z-axis of legend 220 may be oriented with respect to components within device 200. For instance, if device 200 contains mechanical housings, case components, a main logic board, display screens, or other components that may be damaged by expansions of battery housing 112, the +z axis (or −z axis) of legend 220 may be aligned towards these components. Other orientations of the z-axis are also possible.

Accordingly, sensor housing 210 may be arranged such that sensor 130 is fixed with respect to the x-axis and y-axis of legend 220 and thus may be configured to only detect displacements of pressure from the z-axis. Nonetheless, the arrangement of device 200 is such that expansions in the x-axis and y-axis are still captured via an increase in tension on primary band 160 and auxiliary band 170. This tension may be correspondingly applied as pressure onto sensor 130.

FIGS. 2C-2F illustrate alternative arrangements of primary band 160 and auxiliary band 170 with respect to battery housing 112. Notably, the arrangements shown in FIGS. 2C-2F are not intended to be limiting. Other arrangements are also possible.

Figure 2C:
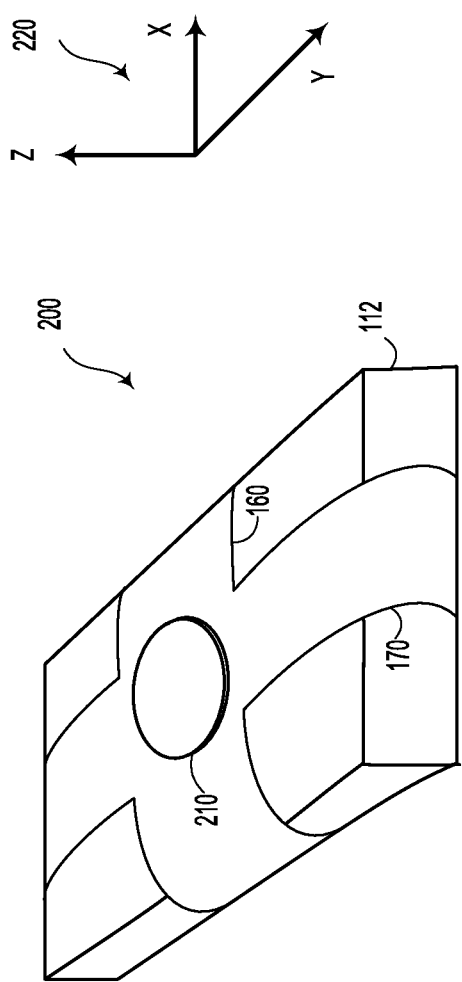
FIG. 2C illustrates an alternative configuration of a device, according to example embodiments.

FIG. 2C illustrates an alternative configuration of device 200 in a non-expanded state, according to example embodiments. In FIG. 2C, primary band 160 may be positioned substantially perpendicular to auxiliary band 170. However, rather than primary band 160 being on top of auxiliary band 170, as depicted in FIG. 2A, primary band 160 and auxiliary band 170 may take the form of a single, cohesive band structure.

Figure 2D:
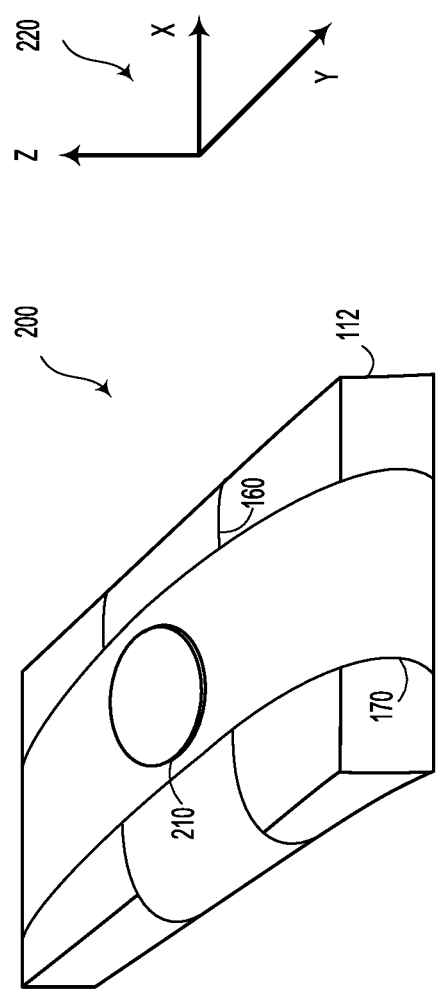
FIG. 2D illustrates an alternative configuration of a device, according to example embodiments.

FIG. 2D illustrates a further alternative configuration device 200 in a non-expanded state, according to example embodiments. In FIG. 2D, primary band 160 may be positioned substantially perpendicular to auxiliary band 170. However, rather than primary band 160 being on top of auxiliary band 170, as depicted in FIG. 2A, auxiliary band 170 may be on top of primary band 160. As such, auxiliary band 170 may contain sensor housing 210.

Figure 2E:
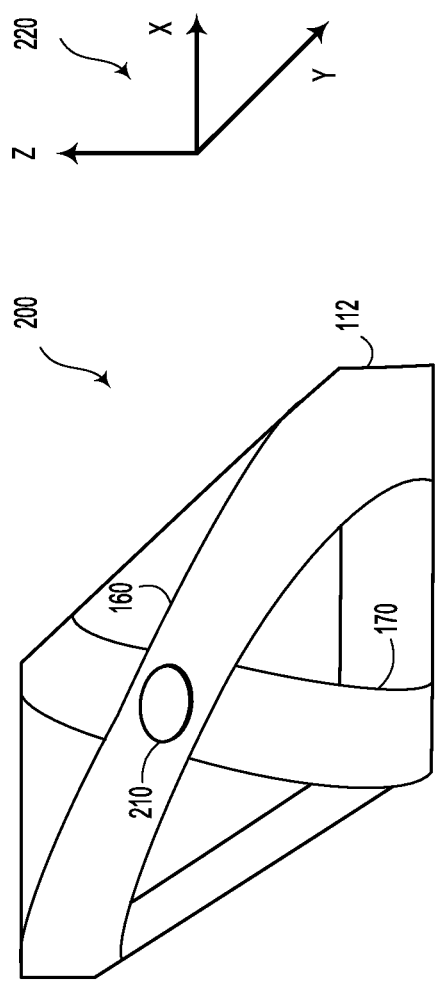
FIG. 2E illustrates an alternative configuration of a device, according to example embodiments.

FIG. 2E illustrates a further alternative configuration device 200 in a non-expanded state, according to example embodiments. In FIG. 2E, primary band 160 may be positioned substantially perpendicular to auxiliary band 170. However, rather than primary band 160 and auxiliary band 170 encircling the edges of battery housing 112, as depicted in FIG. 2A, the arrangement of primary band 160 and auxiliary band 170 are with respect to the corners of battery housing 112.

Figure 2F:
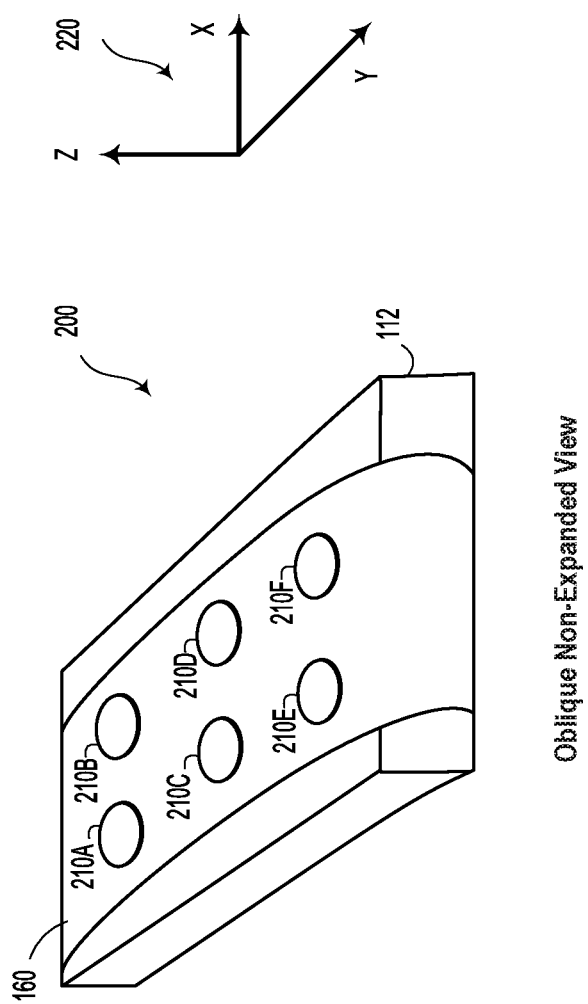
FIG. 2F illustrates an alternative configuration of a device, according to example embodiments.

FIG. 2F illustrates a further alternative configuration device 200 in a non-expanded state, according to example embodiments. In FIG. 2F, auxiliary band 170 is removed and primary band 160 may include a plurality of sensors, for example, sensor 210A, sensor 210B, sensor 210C, sensor 210D, sensor 210E, and sensor 210F, that are placed in substantially close contact to battery housing 112. Sensors 210A-210F may be distributed evenly such that each sensor can detect a relatively equivalent portion of the overall pressure applied by battery housing 112 onto primary band 160 upon expansion. In such an example, the extent of physical expansion of battery housing 112 may be measured by the combination of sensors 210A-210F.

Figure 3B:
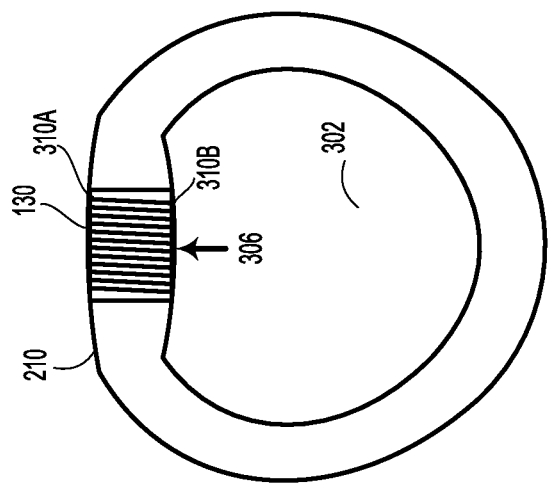
FIG. 3B illustrates a view of a device, according to example embodiments.
Figure 3A:
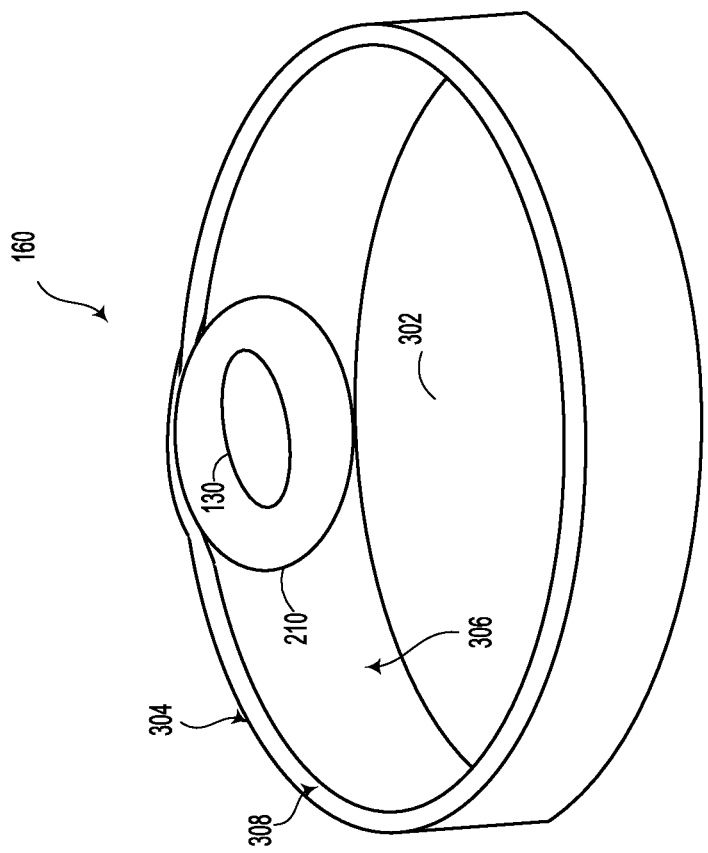
FIG. 3A illustrates a view of a device, according to example embodiments.

FIGS. 3A-3B illustrate a side view and a cross section view of primary band 160. Specifically, FIGS. 3A-3B are presented to further illustrate the interactions between primary band 160 and sensor 130.

FIG. 3A illustrates a side view of primary band 160, according to example embodiments. In FIG. 3A, battery housing 112 is omitted for clarity, but may pass through primary band 160 by way of region 302. As depicted in FIG. 3A, primary band 160 may consist of two distinct sides, exterior side 304 and interior side 306. In between exterior side 304 and interior side 306, gap region 308 may exist. In examples, sensor housing 210 may be lodged in gap region 308 so as to suitably undergo pressure in response to tension on primary band 160 and/or auxiliary band 170.

FIG. 3B illustrates a cross sectional view of primary band 160, according to example embodiments. Similar to FIG. 3A, battery housing 112 is omitted for clarity, but may pass through primary band 160 by way of region 302. As depicted in FIG. 3B, interior side 306 of primary band 160 may apply pressure on sensor housing 210. Since sensor 130 is lodged within sensor housing 210, the pressure applied by interior side 306 may be correspond to the pressure applied onto sensor 130. Further, sensor 130 may consist of upper plate 310A and lower plate 310B. The theory here is that as pressure is applied on sensor 130 from primary band 160, the distance between upper plate 310A and lower plate 310B may undergo a measurable decrease, which in turn may be converted into an estimate of pressure.

The decrease in distance between upper plate 310A and lower plate 310B may be determined based on the structure of sensor 130. For example, if sensor 130 is a capacitance sensor, then sensor 130 may be configured to determine a change in capacitance between upper plate 310A and lower plate 310B. Since capacitance can be inversely proportional to distance, the change in capacitance may be converted into a change in distance, which in turn may be converted, perhaps via controller 150, into an estimate of pressure.

Further, auxiliary band 170, while not depicted, may similarly operate to apply pressure onto sensor 130. For example, if auxiliary band 170 undergoes tension in response to expansions of battery housing 112, the tension may be exerted as pressure onto primary band 160, which, in turn, may apply this additional pressure onto sensor housing 210.

IV. EXAMPLE METHODS

Figure 4:
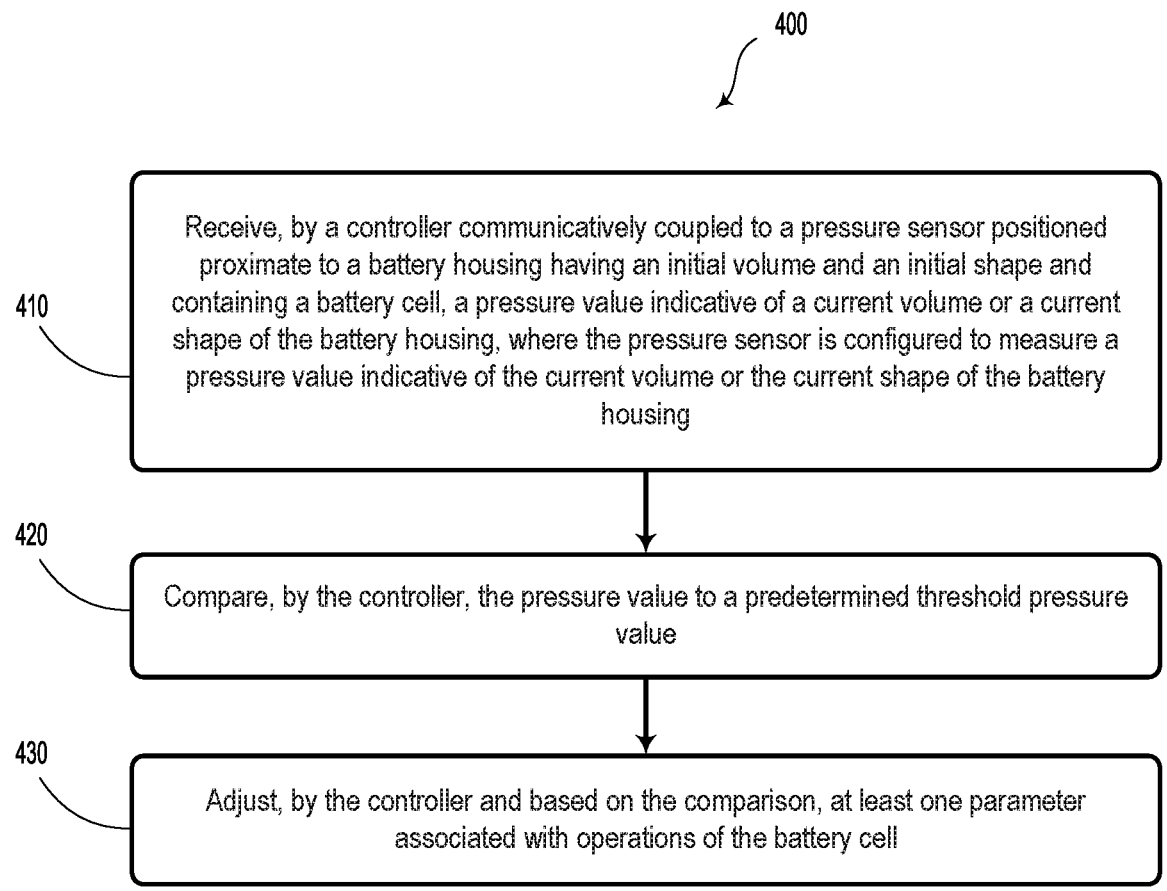
FIG. 4 illustrates a method, according to example embodiments.

FIG. 4 illustrates a method 400, according to example embodiments. Method 400 may include various blocks or steps. The blocks or steps may be carried out individually or in combination. The blocks or steps may be carried out in any order and/or in series or in parallel. Further, blocks or steps may be omitted or added to method 400.

Block 410 includes receiving, by a controller communicatively coupled to a pressure sensor positioned proximate to a battery housing having an initial volume and an initial shape and containing a battery cell, a pressure value indicative of a current volume or a current shape of the battery housing, where the pressure sensor is configured to measure a pressure value indicative of the current volume or the current shape of the battery housing.

In some embodiments, the pressure sensor and the controller may be respectively similar or identical to sensor 130 and controller 150 as illustrated and described with regard to FIG. 1A. Further, the battery cell and the battery housing may be respectively similar or identical to battery 110 and battery housing 112 as illustrated and described with regard to FIG. 1B.

In some embodiments, the pressure sensor could include a capacitive pressure sensor. In such a case, the magnitude of pressure applied by the battery housing may cause a change in capacitance between the plates of the capacitive pressure sensor during battery housing expansion. For example, in some embodiments, the plates of a capacitive pressure sensor could be pressed more closely together, increasing capacitance. In other scenarios, the plates of the capacitive pressure sensor could be pulled further apart, decreasing the overall capacitance. In other embodiments, the pressure sensor could include resistive pressure sensor.

In such a case, the magnitude of pressure applied by the battery housing may correspond to changes in resistance values of the resistive pressure sensor during battery housing expansion. Other types of sensors may also be used.

In some embodiments, alternate forms of information indicative of the current volume or a current shape of the battery housing may be measured. For example, tension values, distance values, or other signals may be measured.

Block 420 includes comparing, by the controller, the pressure value to a predetermined threshold pressure value.

In some embodiments, the predetermined threshold pressure value may be determined programmatically. In one example, the controller may be communicatively coupled to a network that can communicate the threshold pressure value based on environment temperatures, software updates, and so on. In another example, the controller may be configured to programmatically determine the predetermined threshold pressure value upon making a first N measurements of expansion of the battery housing (e.g., N=1, 2, 3, 10, and so on). In such a scenario, the controller can measure the expansion of the battery housing for the N measurements and then determine that the greatest extent of expansion for the N measurements is E. Correspondingly, the predetermined threshold value may be equal to a scalar factor of E. That is, the predetermined threshold value can be E, 2E, 3E, and so on.

In some embodiments, the predetermined threshold pressure value may be preselected and stored by the controller and/or an associated memory device. For instance, given that the battery housing is contained within a device enclosure, the predetermined threshold pressure may be selected and/or stored in memory based on the physical dimensions of the device enclosure or other components within the device enclosure. In some cases, the predetermined threshold pressure could be set by the manufacturer of the controller or battery cell during construction.

Block 430 includes, adjusting, by the controller and based on the comparison, at least one parameter associated with operations of the battery cell.

In some embodiments, adjusting the at least one operating parameter of the device involves adjusting a maximum charge capacity of the battery cell. For example, if the battery cell has a maximum 350 mAh capacity, or a maximum capacity between 350 mAh and 400 mAh, and the predetermined threshold pressure value is met or surpassed by the pressure value, the maximum charge capacity of the battery cell may be adjusted to 340 mAh, to a value between 350 mAh and 340 mAh, or some other value. In other examples, the maximum charge capacity of the battery cell may be adjusted to a percentage (e.g., 10%, 50%, or 90%) of a current maximum charge capacity of the battery cell.

In some embodiments, adjusting the at least one operating parameter of the device involves adjusting a maximum cell voltage of the battery cell. For example, if the battery cell has maximum of 4.5V voltage, or a maximum voltage between 4.5V and 5V, and the predetermined threshold pressure value is met or surpassed by the pressure value, the maximum cell voltage of the battery cell may be adjusted to 4V, to a value between 4V and 3.5V, or some other value. In other examples, the maximum cell voltage of the battery cell may be adjusted to a percentage (e.g., 50%, 70%, or 90%) of the current max voltage of the battery cell.

In some embodiments, adjusting the at least one operating parameter of the device involves adjusting a charge rate of the battery cell. For example, if the battery cell has a current C-rate of 1C, or a C-rate between 1C and 2C, and the predetermined threshold pressure value is met or surpassed by the measured pressure value, the C-rate may be adjusted to 0.2C, to a value between 1C and 0.2C, or some other value. In other examples, the charge rate of the battery cell may be adjusted to a percentage (e.g., 50%, 70%, or 90%) of the current charge rate of the battery cell. In some examples, adjusting the charge rate may happen several times over an entire charging session. Specifically, adjusting the charge rate to 0.2C may be a first adjustment, and subsequent adjustments may occur to increase or decrease the charge rate. In examples, the subsequent adjustments can be based on a current temperature of the battery cell, subsequent measurements from the pressure sensor, and so on.

In some embodiments, adjusting the at least one operating parameter of the device involves adjusting parameters with respect to the battery housing. This may include, for example, opening or closing a gas port vent of the battery housing to discharge gas.

In some embodiments, adjusting the at least one operating parameter of the device involves adjusting parameters with respect to the controller. For example, the controller may include or may be communicatively coupled to a processing unit or other high-power components. Accordingly, the adjustment may include lowering the power state of the components to decrease thermal output, which may be affecting the health of the battery cell.

In some embodiments, adjusting the at least one operating parameter of the device involves informing a user that the battery cell may be on a trajectory toward abnormal expansion. For example, if after lowering the maximum possible charge capacity of the battery cell, the battery housing continues to swell in an undesirable manner, battery health information may be communicated to a user (e.g., via a graphical user interface (GUI) coupled to the controller).

V. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    a battery cell, wherein the battery cell comprises a battery housing having an initial volume and an initial shape;
    a pressure sensor, wherein the pressure sensor is positioned proximate to the battery housing, wherein the pressure sensor is configured to measure a pressure value indicative of a current volume or a current shape of the battery housing;
    a primary band coupled around a perimeter of the battery housing and having a first orientation, wherein the primary band includes a sensor housing that contains the pressure sensor, wherein the primary band is capable of expanding and increasing tension in proportion to expansions of the battery housing beyond the initial volume or the initial shape, and wherein the pressure value indicative of the current volume or the current shape of the battery housing is based on a current tension of the primary band with respect to the battery housing;
    an auxiliary band coupled around the perimeter of the battery housing and having a second orientation that is substantially perpendicular to the first orientation, wherein the auxiliary band intersects the primary band; and a controller operable to perform operations, the operations comprising:
        receiving, from the pressure sensor, the pressure value indicative of the current volume or the current shape of the battery housing;
        comparing the pressure value indicative of a current volume or a current shape of the battery housing to a predetermined threshold pressure value; and
        based on the comparison, adjusting at least one operating parameter of the system.

2. The system of claim 1, wherein the auxiliary band is capable of expanding and increasing tension in proportion to expansions of the battery housing beyond the initial volume or the initial shape, and wherein the pressure value indicative of the current volume or the current shape of the battery housing is based on the current tension of the primary band with respect to the battery housing and a current tension of the auxiliary band with respect to the battery housing.

3. The system of claim 1, wherein the primary band and the auxiliary band comprise a thermally conductive material.

4. The system of claim 1, wherein the primary band and the auxiliary band comprise a material more rigid than the battery housing.

5. The system of claim 1, wherein the pressure sensor comprises a capacitive pressure sensor or a resistive pressure sensor.

6. The system of claim 1, wherein adjusting the at least one operating parameter of the system comprises adjusting a charging rate of the battery cell, adjusting a maximum charge capacity of the battery cell, or adjusting a maximum cell voltage of the battery cell.

7. A device comprising:
    a pressure sensor, wherein the pressure sensor is positioned proximate to a battery housing having an initial volume and an initial shape and containing a battery cell, and wherein the pressure sensor is configured to measure a pressure value indicative of a current volume or a current shape of the battery housing;
    a primary band coupled around a perimeter of the battery housing and having a first orientation, wherein the primary band includes a sensor housing that contains the pressure sensor, wherein the primary band is capable of expanding and increasing tension in proportion to expansions of the battery housing beyond the initial volume or the initial shape, and wherein the pressure value indicative of the current volume or the current shape of the battery housing is based on a current tension of the primary band with respect to the battery housing;
    an auxiliary band coupled around the perimeter of the battery housing and having a second orientation that is substantially perpendicular to the first orientation, wherein the auxiliary band intersects the primary band; and
    a controller operable to perform operations, the operations comprising:
        receiving, from the pressure sensor, the pressure value indicative of the current volume or the current shape of the battery housing;
        comparing the pressure value indicative of the current volume or the current shape of the battery housing to a predetermined threshold pressure value; and
        based on the comparison, adjusting at least one operating parameter of the device.

8. The device of claim 7, wherein the auxiliary band is capable of expanding and increasing tension in proportion to expansions of the battery housing beyond the initial volume or the initial shape, and wherein the pressure value indicative of the current volume or the current shape of the battery housing is based on the current tension of the primary band with respect to the battery housing and a current tension of the auxiliary band with respect to the battery housing.

9. The device of claim 7, wherein the primary band and the auxiliary band comprise a thermally conductive material.

10. The device of claim 7, wherein the primary band and the auxiliary band comprise a material more rigid than the battery housing.

11. The device of claim 7, wherein the pressure sensor comprises a capacitive pressure sensor or a resistive pressure sensor.

12. The device of claim 7, wherein adjusting the at least one operating parameter of the device comprises adjusting a charging rate of the battery cell, adjusting a maximum charge capacity of the battery cell, or adjusting a maximum cell voltage of the battery cell.

13. A method comprising:
receiving, by a controller communicatively coupled to a pressure sensor positioned proximate to a battery housing having an initial volume and an initial shape and containing a battery cell, a pressure value indicative of a current volume or a current shape of the battery housing, wherein the pressure sensor is configured to measure the pressure value indicative of the current volume or the current shape of the battery housing, wherein a primary band coupled around a perimeter of the battery housing and having a first orientation, wherein the primary band includes a sensor housing that contains the pressure sensor, wherein the primary band is capable of expanding and increasing tension in proportion to expansions of the battery housing beyond the initial volume or the initial shape, and wherein the pressure value indicative of the current volume or the current shape of the battery housing is based on a current tension of the primary band with respect to the battery housing, further comprising an auxiliary band coupled around the perimeter of the battery housing and having a second orientation that is substantially perpendicular to the first orientation, wherein the auxiliary band intersects the primary band;
comparing, by the controller, the pressure value indicative of the current volume or the current shape of the battery housing to a predetermined threshold pressure value; and
adjusting, by the controller and based on the comparison, at least one parameter associated with operations of the battery cell.

14. The method of claim 13, wherein adjusting the at least one parameter associated with operations of the battery cell comprises adjusting a charging rate of the battery cell, adjusting a maximum charge capacity of the battery cell, or adjusting a maximum cell voltage of the battery cell.

* * * * *